United States Patent

Stones et al.

(10) Patent No.: US 6,863,493 B2
(45) Date of Patent: Mar. 8, 2005

(54) LUBRICATING SYSTEMS FOR REGENERATIVE VACUUM PUMPS

(75) Inventors: Ian David Stones, Burgess Hill (GB); Stuart John Hobbs, Hove (GB)

(73) Assignee: The BOC Group plc, Windlesham (GB)

( * ) Notice: Subject to any disclaimer, the term of this patent is extended or adjusted under 35 U.S.C. 154(b) by 24 days.

(21) Appl. No.: 10/164,757

(22) Filed: Jun. 7, 2002

(65) Prior Publication Data

US 2003/0003004 A1 Jan. 2, 2003

(30) Foreign Application Priority Data

Jun. 13, 2001  (GB) .............................................. 0114417

(51) Int. Cl.[7] .............................................. F04D 29/06
(52) U.S. Cl. ...................... 415/111; 415/112; 415/121.2
(58) Field of Search ................. 415/111, 112, 415/121.2; 417/423.13; 184/6.18

(56) References Cited

U.S. PATENT DOCUMENTS

| | | | |
|---|---|---|---|
| 3,877,546 A | * | 4/1975 | Shrader ..................... 184/6.18 |
| 4,140,441 A | | 2/1979 | Patterson |
| 4,668,160 A | | 5/1987 | Mase et al. |
| 4,734,018 A | * | 3/1988 | Taniyama et al. ......... 417/423.4 |
| 4,767,265 A | * | 8/1988 | Osterstom ................... 415/229 |
| 5,461,636 A | | 10/1995 | Karube et al. |
| 5,536,148 A | | 7/1996 | Nishiuchi et al. |
| 5,779,005 A | * | 7/1998 | Jones, Jr. et al. .......... 184/6.18 |

FOREIGN PATENT DOCUMENTS

| | | |
|---|---|---|
| EP | 0 805 275 A | 11/1997 |
| FR | 2 136 664 A | 12/1972 |

OTHER PUBLICATIONS

UK Patent Office Search Report dated Oct. 10, 2001.
European Search Report of Application No. EP 02253948.0 dated Sep. 1, 2003.

* cited by examiner

Primary Examiner—Ninh H. Nguyen
(74) Attorney, Agent, or Firm—Ira Lee Zebrak

(57) ABSTRACT

In a vacuum pump of the regenerative type or including a regenerative section in which a rotatable vertical shaft is supported by upper and lower bearings, a lubricating system for lubricating the upper bearing comprising an axial bore extending along the shaft and communicating at its upper end with at least one oil hole in alignment with the upper bearing, the lower open end of the axial bore extending in to a shaft reservoir located in a sump for containing lubricating fluid, the arrangement being such that centrifugal force generated by the rotation of the shaft will cause the lubricating fluid in the shaft reservoir to pass along the axial bore as a thin film towards the oil hole and hence to the upper bearing, in which at least one port is formed in a wall of the shaft reservoir to permit the passage of lubricating fluid therethrough from the sump in a controlled manner dependent upon the head of lubricating fluid in the sump above the port.

5 Claims, 4 Drawing Sheets

LUBRICATING SYSTEMS FOR REGENERATIVE VACUUM PUMPS

FIELD OF THE INVENTION

This invention relates to vacuum pumps of the regenerative type or which incorporate a regenerative section and which incorporate a high speed rotatable vertical shaft supported by bearings at each end of the shaft and in particular to lubricating systems for such bearings.

BACKGROUND OF THE INVENTION

In vacuum pumps of the regenerative type a rotor is mounted on a vertical shaft for rotation within a surrounding stator. The shaft is supported by upper and lower bearings which require lubrication. To facilitate lubrication of the upper bearing the shaft has a central axial bore and communicating radial holes in alignment with the upper bearing for delivering lubricating fluid to the bearing.

A problem associated with lubricating the upper bearing is that for priming the lubricating fluid circuit quickly when the pump is started requires the presence of a relatively large volume of lubricating fluid accessible to the shaft. However, if the large volume of lubricating fluid remains in contact with the shaft when the shaft is rotating at normal working speeds the fluid will produce a drag effect and deliver an excessive quantity of oil to the bearings once the circuit is primed.

SUMMARY OF THE INVENTION

It is an aim of this invention to provide a lubricating system for a vacuum pump of the regenerative type or incorporating a regenerative section in which the volume of lubricating fluid in contact with the shaft is metered to provide a set quantity for priming when the shaft starts rotating but thereafter meters the delivery of oil to the bearing in a way which is not dependent upon the rotary speed of the shaft.

BRIEF DESCRIPTION OF THE DRAWINGS

An embodiment of the invention will now be described by way of example, reference being made to the Figures of the accompanying diagrammatic drawings in which.

DETAILED DESCRIPTION OF THE INVENTION

Figure 1:
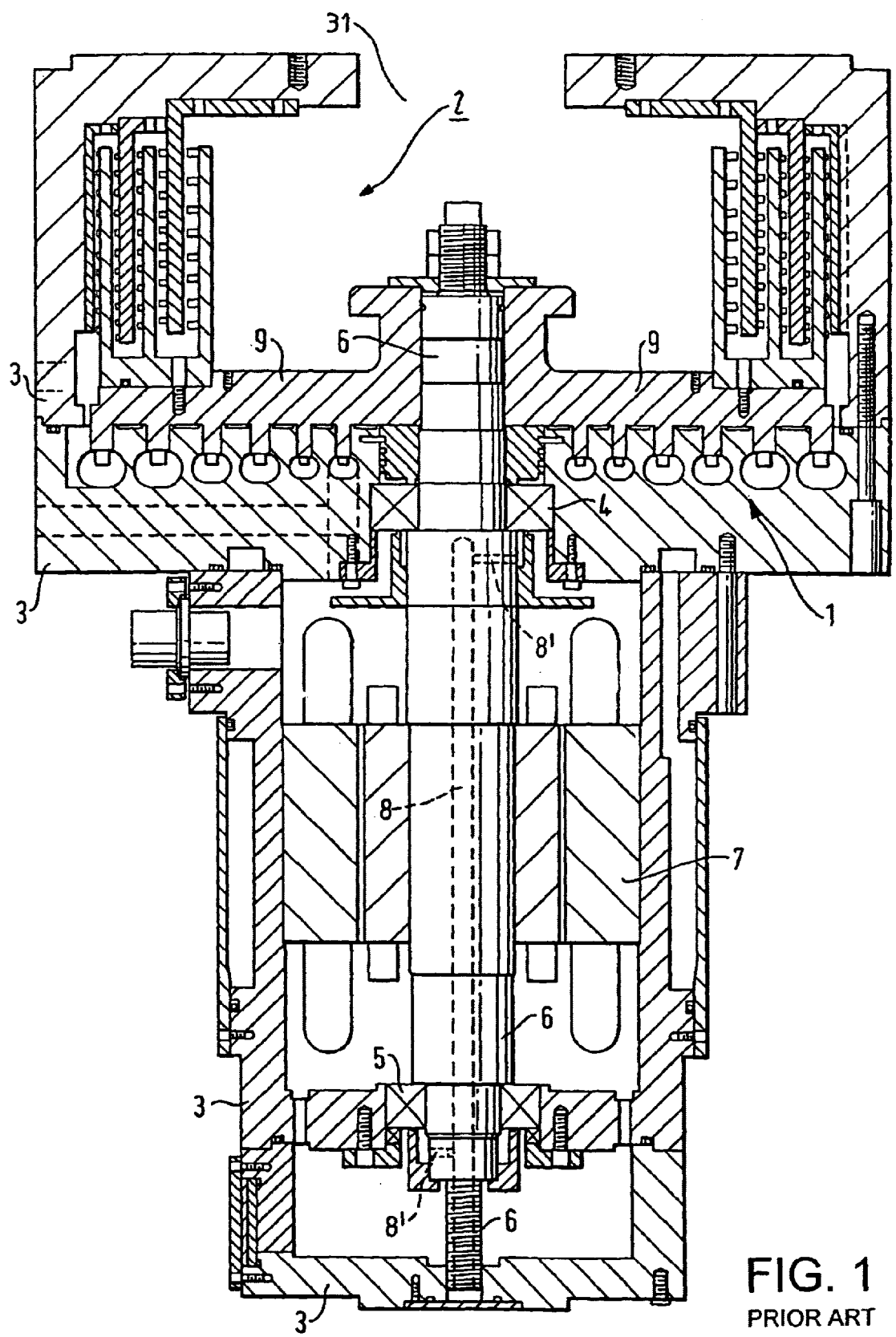
FIG. 1 is a cross section through a known compound vacuum pump including a regenerative section.

Referring first to FIG. 1 which illustrates a known compound vacuum pump comprising a regenerative section 1 and a molecular drag (Holweck) section 2. The pump includes a casing 3 made from a number of different body parts bolted or otherwise fixed together and provided with relevant seals therebetween.

Mounted within the casing 3 is a vertical shaft 6 supported by an upper bearing 4 and a lower bearing 5. The shaft 6 is rotatable about its longitudinal axis and is driven by an electric motor 7 surrounding the shaft 6. Securely attached to the shaft for rotation therewith is a rotor 9. An axial bore 8 extends along a substantial length of the shaft and communicates with radial oil holes 8' for delivering lubricating fluid from a shaft fluid lubricant reservoir to the upper bearing 4.

Figure 2:
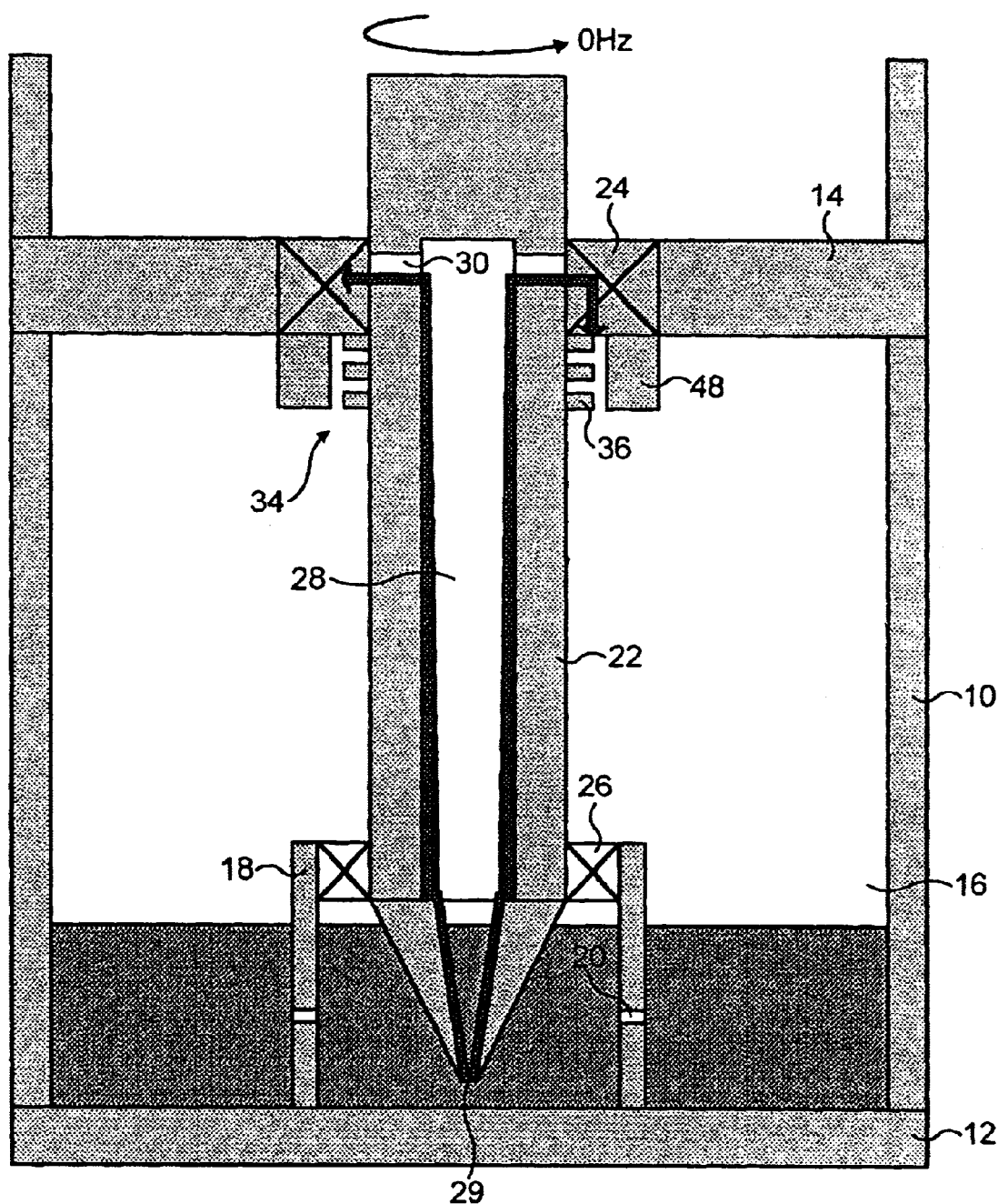
FIG. 2 is a cross section through part of a vacuum pump of the regenerative type illustrating a lubricating system according to the present invention for lubricating an upper bearing of a rotating shaft when the shaft is stationary.
Figure 3:
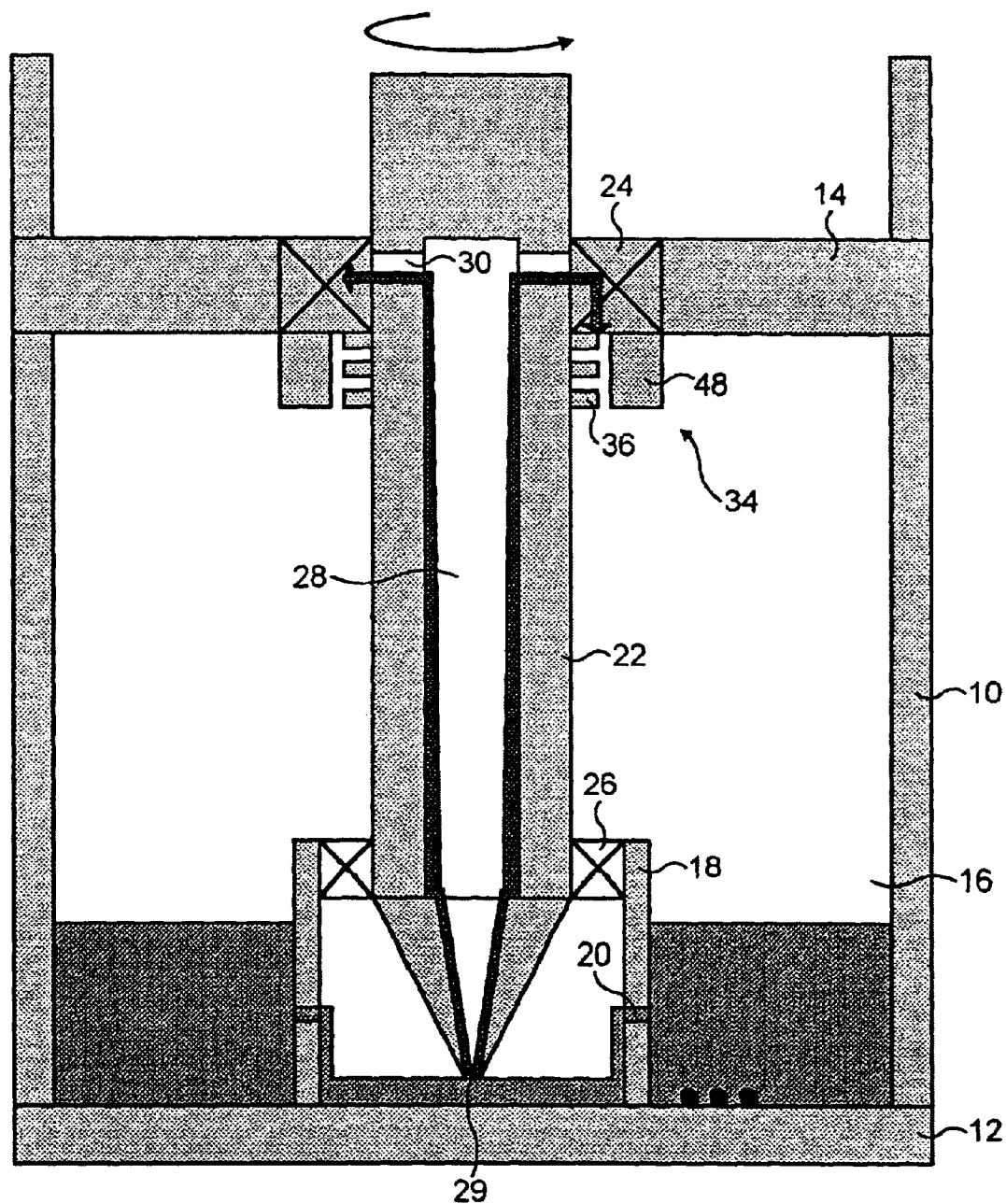
FIG. 3 is a cross section similar to FIG. 2 but illustrating the lubricating system when the shaft is rotating at normal working speeds.

Referring now to FIGS. 2 and 3 which illustrate the lower end of a vacuum pump of the regenerative type which incorporates the lubrication system of the present invention. As shown, a casing 10 defines with a base plate 12 and a cover plate 14, a sump 16. Within the sump 16 and supported by the base plate 12 is a shaft lubricating fluid reservoir 18. Lubricating fluid, for example oil, contained within the sump 16 enters the shaft reservoir 18 in a controlled manner via ports 20 in the shaft reservoir wall as will be explained.

A vertical shaft 22 forming part of a vacuum pump of the regenerative type is mounted in upper bearing 24 and lower bearing 26. The shaft 22 is generally cylindrical and has formed therein an axial bore 28 open at its lower end 29 in the shaft reservoir 18. The axial bore 28 communicates at its upper end with radial oil holes 30 in alignment with the upper bearing 24.

An axial impeller 34 is located in the housing 16 immediately below the upper bearing 24 and consists of an impeller thread 36 formed on the outer surface of the shaft 22 and a static counter-face 48 depending from the outer race of the bearing 24.

The axial impeller 34, inlets 20 axial bore 28 and oil holes 30 define a lubricating fluid delivery circuit as will be explained.

When the shaft 22 is stationary then the levels of lubricating fluid in the shaft lubricating fluid reservoir 18 and the sump 16 will be the same as illustrated in FIG. 2. This means that a relatively large quantity of lubricating fluid will be in contact with the shaft 22 both externally of the shaft and within the axial bore 28. This situation allows for a quick priming of the lubricating fluid circuit when the vacuum pump is started and the shaft 22 commences to rotate.

When the shaft 22 reaches normal working speed then the lubricating fluid in the shaft reservoir 18 will be drawn from the reservoir through the open lower end 29 of the axial bore 28 by centrifugal force. The fluid will travel axially up the axial bore 28 towards the oil holes 30 as a thin film. Subsequently, the fluid will lubricate the upper bearing 24 and then be forced by means of the axial impeller 34 back down in to the sump 16.

According to the present invention, the lubricating fluid feed to the axial bore 28 is regulated to a level below that which the shaft 22 can pump thereby removing the variants in oil quantity delivered to the bearing as a function of shaft speed. To control the delivery of fluid to the shaft reservoir 18 from the sump 16 there are carefully calibrated fluid ports 20. These ports 20 provide a fluid flow rate in to the shaft reservoir 18 dependent upon the head of fluid in the sump 16 above the ports 20. The ports 20 are specifically designed to be above the steady state height of the shaft reservoir fluid level to avoid back pressure. These ports 20 are designed to ensure that the range of maximum expected oil levels correlates to a range of acceptable fluid delivery rates for the bearing 24.

It will be evident that a regenerative pump must operate over a wide range of operational frequencies. The effect this has on fluid pumping speed is not manageable since slow frequencies may starve the bearing of lubrication whilst high frequencies may flood the bearings.

The fluid ports 20 are located at a height which allows for debris to fall below them whilst still within the sump 16 thereby avoiding delivery to the shaft reservoir 8. The fluid in the sump 18 is not subject to turbulence and should collect any such particulates without blocking the fluid ports 20.

Figure 4:
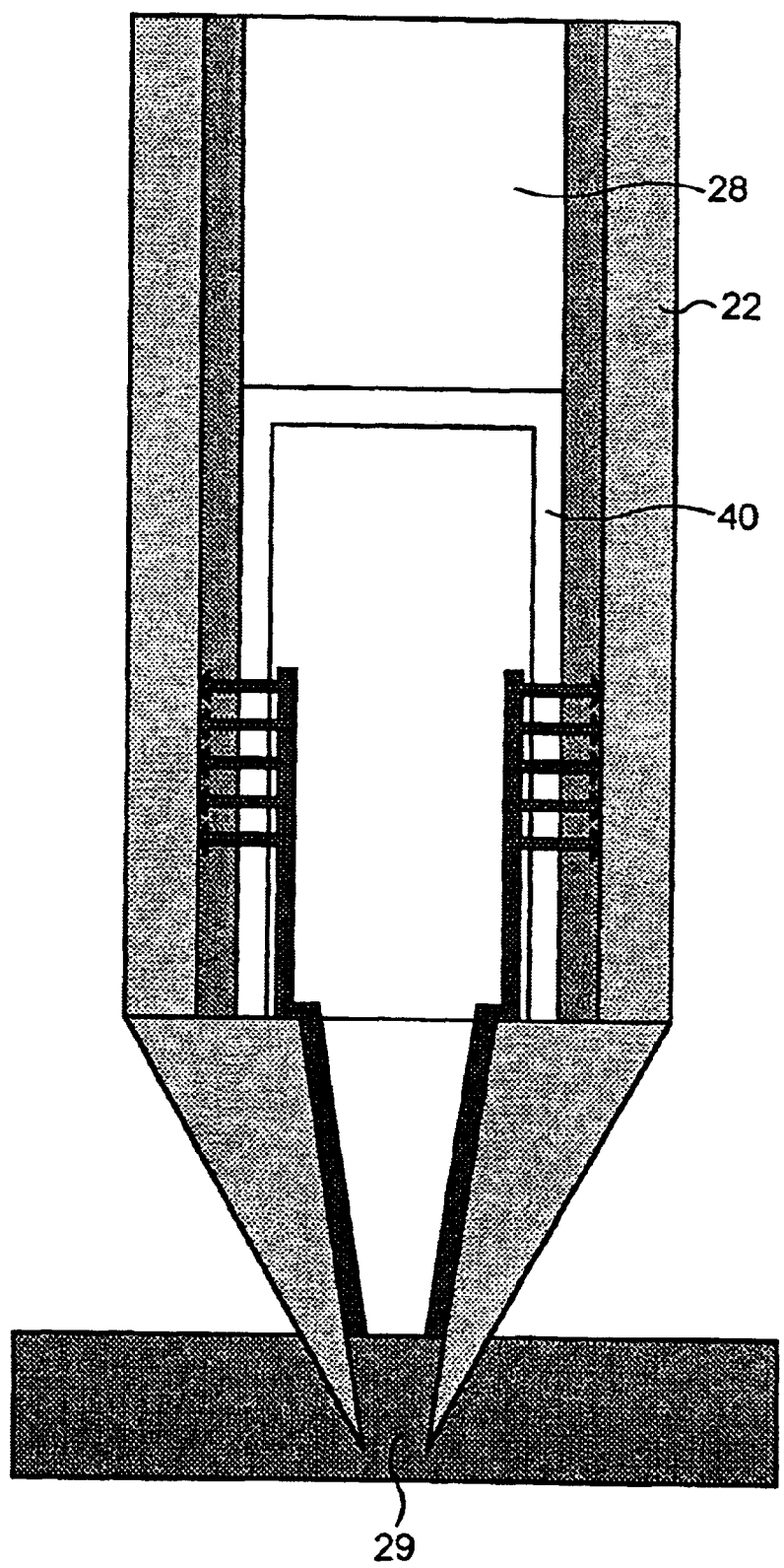
FIG. 4 is a detail in cross section illustrating a filter in the lubricating system of FIGS. 2 and 3.

Referring now to FIG. 4, this shows a modification to the lubricating system of FIGS. 2 and 3 in that a filter 40 is located at the lower end of the axial bore 28. When the shaft 22 is rotating the centrifugal force generated is utilised to drive the lubricating fluid through the filter 40 on to the walls of the axial bore 28.

What is claimed is:

1. In a vacuum pump of the regenerative type or including a regenerative section in which a rotatable vertical shaft is supported by upper and lower bearings, a lubricating system for lubricating the upper bearing comprising:

an axial bore extending along the shaft and communicating at its upper end with at least one oil hole in alignment with the upper bearing, the lower open end of the axial bore extending in to a shaft reservoir located in a sump for containing lubricating fluid, the arrangement being such that centrifugal force generated by the rotation of the shaft will cause the lubricating fluid in the shaft reservoir to pass along the axial bore as a thin film towards the oil hole and hence to the upper bearing, in which at least one port is formed in a wall of the shaft reservoir to permit the passage of lubricating fluid therethrough from the sump in a controlled manner dependent upon the head of lubricating fluid in the sump above the port.

2. A lubricating system as claimed in claim 1, in which an impeller is located immediately below the upper bearing for drawing lubricating fluid from the upper bearing in to the sump.

3. A lubricating system as claimed in claim 2, in which the impeller is formed as a thread on the outside cylindrical surface of the shaft and includes a counter-face extending from the upper bearing.

4. A lubricating system as claimed in claim 2, in which a filter is located in the axial bore.

5. A lubricating system as claimed in claim 1, in which a filter is located in the axial bore.

* * * * *